United States Patent
Franzen et al.

(10) Patent No.: US 6,224,114 B1
(45) Date of Patent: May 1, 2001

(54) PIPE JOINT

(75) Inventors: Rainer Franzen, Krefeld; Herbert Foering, Solingen, both of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/230,477

(22) PCT Filed: Jul. 22, 1997

(86) PCT No.: PCT/DE97/01581

§ 371 Date: Jan. 26, 1999

§ 102(e) Date: Jan. 26, 1999

(87) PCT Pub. No.: WO98/04862

PCT Pub. Date: Feb. 5, 1998

(30) Foreign Application Priority Data

Jul. 26, 1996 (DE) .............................................. 196 31 574

(51) Int. Cl.[7] .................................................. F16L 13/14
(52) U.S. Cl. ........................ 285/110; 285/104; 285/340; 285/382.2
(58) Field of Search ............................. 285/23, 104, 105, 285/110, 382, 382.2, 340

(56) References Cited

U.S. PATENT DOCUMENTS

| | | | |
|---|---|---|---|
| 2,831,711 | * 4/1958 | Leadbetter | 285/382 |
| 3,249,373 | * 5/1966 | Goldstein | 285/382 |
| 3,920,270 | * 11/1975 | Babb, Jr. | 285/104 |
| 4,018,462 | * 4/1977 | Saka | 285/382.2 |
| 4,146,254 | * 3/1979 | Turner et al. | 385/105 |
| 5,484,174 | * 1/1996 | Gotoh | 285/382 |

FOREIGN PATENT DOCUMENTS

| | | | |
|---|---|---|---|
| 2627512 | * 12/1977 | (DE) | 285/382 |
| 2030859 | * 1/1979 | (DE) | 285/104 |
| 605006 | * 7/1949 | (GB) | 285/104 |
| 106919 | * 8/1979 | (JP) | 285/382 |
| 403177688 | * 8/1991 | (JP) | 285/382 |

* cited by examiner

*Primary Examiner*—Eric K. Nicholson
(74) *Attorney, Agent, or Firm*—Cohen, Pontani, Lieberman & Pavane

(57) ABSTRACT

A pipe joint, includes a press fitting with a section that is beaded in cross-section and holds a sealing ring and with a cylindrical area attached thereto that has, at the end of its extension, a flange-like depression forming a stop. The pipe joint also includes a pipe, whose smooth end, after being inserted into the press fitting, comes to rest on the inner stop of the press fitting. A non-detachable, tight pipe joint is formed by means of a pressing tool having at least two pressing jaws encompassing the press fitting after the pressing jaws are closed. During pressing, the pressing jaws act both on the annular bead, including the sealing ring placed therein, and on the cylindrical area of the press fitting. A clamping means that largely prevents the axial displacement of the inserted pipe and whose internal diameter in the non-stressed state is smaller than the smallest external diameter of the inserted pipe permitted by tolerances is arranged in the insertion area for the pipe in the press fitting outside the action area of the pressing jaws.

10 Claims, 1 Drawing Sheet

PIPE JOINT

BACKGROUND OF THE INVENTION

1. Field of the Invention

The invention relates to a pipe joint, including a press fitting and a pipe to be connected thereto.

2. Description of the Prior Art

A generic pipe joint with a fitting that encompasses the smooth ends of pipes is known. The fitting has beaded ends, which hold a sealing ring. The beaded end and a cylindrical area of the fitting adjacent to the beaded end are deformed plastically with the pipe. The sealing ring is simultaneously deformed elastically. These deformations are effected by an exchangeable holding device with articulated jaws, which is connected to an operating device (see, for example, the brochure "Mannesmann Press Fitting GmbH" [*Mannesmann Pressfitting GmbH*] Edition of August 1994). The sealing function of the joint is achieved by virtue of the fact that, due to the plastic deformation of the beaded end, the sealing ring is elastically deformed and, over a certain part of the cross-sectional periphery, comes to rest in line contact on the surrounding surfaces of the beaded fitting and pipe ends. To absorb the longitudinal forces occurring at the existing internal pressure, the cylindrical area of the fitting adjacent to the beaded end is plastically deformed together with the pipe. During pressing, the beaded end and the adjacent cylindrical area are deformed simultaneously by means of the operating device. It is noted on Pages 13 and 14 of the brochure that a correct insertion length for the pipe is essential to a reliable press connection. Here, the "correct insertion length" means that before pressing, the pipe, while being turned slightly and simultaneously pressed in the axial direction, should be inserted up to a stop created by the flange-like depression of a press fitting. A marking previously applied to the pipe serves as a control. However, at construction sites, for reasons of practical work sequence, pipe-laying is not always performed by one completing one section at a time in a step-by step-manner, i.e., measurement, cutting, trimming, insertion and pressing. Instead, several pipe sections to be connected are measured cut and inserted together at the same time. After the several pipe sections are inserted together, then all of the connection points are pressed. Under these circumstances, imprecise measurements of pipe insertion cannot be ruled out, especially in cramped space conditions. It is also possible that a pipe section may be too short to be fully inserted into one or even two press fittings or that an already inserted pipe can withdraw by some amount from a press fitting after alignment of the conduit before the pressing step. Because this withdrawal or displacement cannot be recognized from the outside, pressing is carried out nonetheless. Depending on the degree of withdrawal or displacement, such incorrect pressing points can lead, due to movement of the conduit, to loss of tightness or even, in some cases, to a detached connection.

SUMMARY OF THE INVENTION

The object of the invention is to provide a generic pipe joint in which the cut pipe inserted into the press fitting can be withdrawn or displaced only by the use of force.

This object is attained by a pipe joint including a press fitting having a beaded cross-section portion, a flange-like depression forming an insertion stop and a cylindrical area between the beaded cross-section portion and the flange-like depression, a sealing ring held in the beaded cross-section, and a pipe having an end area inserted into the press fitting along an insertion direction through the beaded cross-section to the insertion stop. The pipe has an external diameter and tolerances such that the pipe has a smallest allowable external diameter allowed by the tolerances. The beaded cross-section portion of the press fitting and a portion of the cylindrical area proximate the beaded cross-section portion are pressable onto the sealing ring and the pipe by two pressing jaws of a pressing tool for forming the pipe joint. The pipe joint also includes a clamping means for preventing axial displacement of the pipe in the press fitting when the end area of the pipe is inserted to the insertion stop. The clamping means is positioned in the cylindrical area outside of the portion of the cylindrical area proximate the beaded cross-section portion, and the clamping means having an internal diameter in a non-stressed state that is smaller than the smallest allowable external diameter of the pipe.

The core of the invention is the arrangement, in the insertion area for the pipe in the press fitting, of a means that prevents displacement of the inserted pipe. This means can be a ring of an elastic material, an annular spring element of a metal material, or an annular spring element of a composite material of metal and plastic. Such a ring is also referred to as a clamping ring. Advantageously, the ring has an inwardly-extending projection, which, to avoid making insertion of the pipe unnecessarily difficult, inclines slightly in the insertion direction. In all cases, the internal diameter of the ring, the projection, and the spring element in the non-stressed state must be smaller than the smallest external diameter of the inserted pipe permitted by tolerances. To arrange the ring or annular spring element, it is advantageous for an annular recess to be provided on the inside of the press fitting in the cylindrical area outside the action area of the pressing jaws. This recess can be located between the annular flare which forms an insertion limit for the pipe and the action area of the pressing jaw. Preferably, the recess is created by an outwardly-extending flange.

When a clamping ring is used, assembly is carried out in such a way that the outward extending flange is formed in the course of producing the press fitting. Along with the sealing ring, the clamping means is placed in the annular recess created by the flange. After the outward extending required length of pipe being connected is measured out and the end face is trimmed, the end of the pipe is inserted into the press fitting until the pipe-fitter senses that the end face has overcome the resistance of the clamping means and has reached the insertion limit in the press fitting. The clamping means holds the pipe in a lock-in effect. Unwanted displacement of the pipe is prevented, unless violent force is applied.

An advantage of the arrangement according to the invention is the quasi lock-in effect gives the pipe-fitter an aid not dependent on markings to ensure the necessary minimum insertion depth, and unintentional displacement of the pipe, e.g., during orientation of the conduit, is prevented.

When the clamping means is arranged between the action area of the pressing jaws and the stop or insertion limit flange, a secondary effect. is that the small gap between the interior of the press fitting and the exterior of the inserted pipe is largely sealed.

BRIEF DESCRIPTION OF THE DRAWING

The pipe joint according to the invention is explained in greater detail in reference to an example shown in the drawings. The drawings shows.

DETAILED DESCRIPTION OF THE PREFERRED EMBODIMENT

Figure 1:
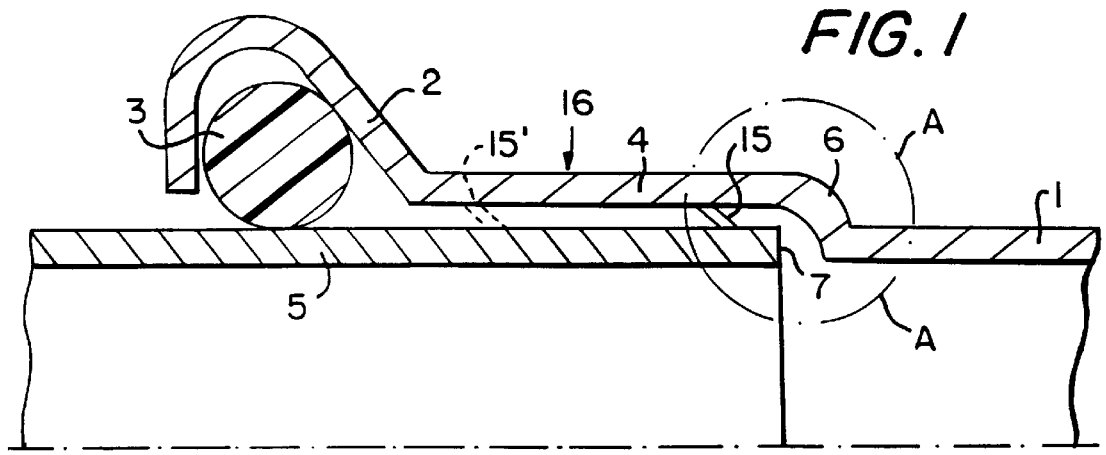
FIG. 1 shows a longitudinal section of a pipe joint according to an embodiment of the present invention before pressing.

FIG. 1 shows a pipe joint before pressing, in longitudinal section. This pipe joint comprises a press fitting 1, which has at its open end an annular flare 2, in which is arranged a sealing ring 3. Attached to the flare 2 is a cylindrical section 4, which at the end of its extension goes over into a flange-like depression 6, which forms the stop for the pipe 5 to be connected. When correctly inserted, the end face 7 of the pipe 5 comes to rest on the flange-like depression 6 of the press fitting.

Figure 2:
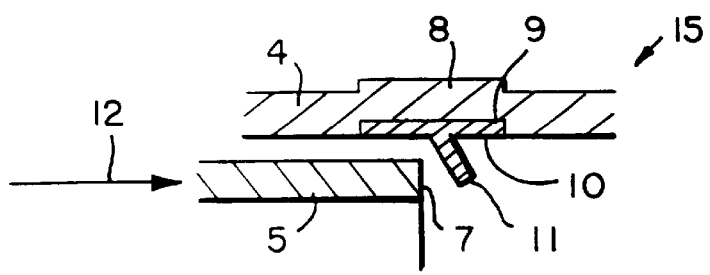
FIG. 2. shows a detail A of the pipe joint of FIG. 1 during an insertion of a pipe in a press fitting.
Figure 3:
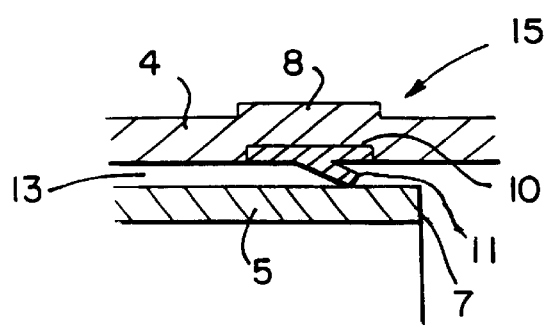
FIG. 3 shows a detail A of the pipe joint of FIG. 1 after the pipe is inserted in the press fitting.

Referring also to which FIGS. 2 and 3 which show Detail A from FIG. 1 during and after the insertion phase, respectively, the cylindrical area 4 of the press fitting 1 has a outwardly-directed flange 8, so that a cylindrical recess 9 is formed on the inside of the press fitting 1. Arranged in this recess is a clamping means 15 in the form of an elastic ring 10. This ring 10 has an inwardly-directed projection 11 inclined slightly in the insertion direction 12.

FIG. 3 shows the clamping means 15 after insertion of the pipe 5. During insertion, the end face 7 of the pipe 5 pushes away the projection 11, so that the ring 10 then acts with radial prestress on the pipe 5. By suitable selection of the ring 10 with respect to design, strength and spring action, it is possible to attain a radial force acting on the outer circumferential surface 13 of the pipe 5 so large that displacement of the pipe 5 from the press fitting 1 is prevented, unless the joint is pulled apart violently.

The annular flare 2 and a portion 16 of the cylindrical section 4 are pressable by a pressing tool (not shown) onto the pipe 5. As a result of the pressing, the annular flare 2 and cylindrical section 4 are plastically deformed and the sealing ring is elastically deformed between the press fitting 1 and the pipe 5. The clamping means 15 may be positioned between the portion 16 of the cylindrical section 4 that is acted on by the pressing tool and the annular flare 2 as shown by clamping means 15 in FIG. 1 or between the portion 16 of the cylindrical section 4 that is acted on by the pressing tool and the flange-like depression 6 as shown by clamping means 15' in dotted lines in FIG. 1.

What is claimed:

1. A pipe joint, comprising:

a press fitting having a beaded cross-section portion, a flange-like depression forming an insertion stop and a cylindrical area between said beaded cross-section portion and said flange-like depression;

a sealing ring held in said beaded cross-section;

a pipe having an end area inserted into said press fitting along an insertion direction through said beaded cross-section to said insertion stop, said pipe having an external diameter and tolerances such that said pipe has a smallest allowable external diameter allowed by said tolerances;

said beaded cross-section portion of said press fitting and a portion of said cylindrical area proximate to said beaded cross-section portion being pressable onto said sealing ring and said pipe by two pressing jaws of a pressing tool for forming said pipe joint; and clamping means for preventing axial displacement of said pipe in said press fitting when said end area of said pipe is inserted to said insertion stop, said clamping means being positioned in said cylindrical area outside of said portion of said cylindrical area proximate to said beaded cross-section portion, and said clamping means having an internal diameter in a non-stressed state that is smaller than said smallest allowable external diameter of said pipe.

2. The pipe joint of claim 1, wherein said clamping means comprises an elastic ring.

3. The pipe joint of claim 2, wherein said elastic ring further comprises an inwardly-extending projection.

4. The pipe joint of claim 3, wherein said projection is inclined along said insertion direction of said pipe.

5. The pipe joint of claim 1, wherein said clamping means comprises an annular spring element.

6. The pipe joint of claim 5, wherein said annular spring element comprises one of a metal material and a composite material of metal and plastic.

7. The pipe joint of claim 1, wherein said clamping means is arranged in an annular recess on an interior of said cylindrical area.

8. The pipe joint of claim 7, wherein said recess is positioned between said beaded cross-section portion and said area of said cylindrical area that is pressable by said pressing tool.

9. The pipe joint of claim 7, wherein said recess is positioned between said area of said cylindrical area that is pressable by said pressing tool and said flange-like depression.

10. The pipe joint of claim 7, wherein said recess is formed by an outwardly-extending flange on said cylindrical area of said press fitting.

* * * * *